3,177,914
SELF-LOCKING NUT
John A. MacLean III, deceased, late of Northbrook, Ill., by Joy D. MacLean, administrator, Northbrook, and John A. MacLean, Jr., Winnetka, Ill., assignors to Mac-Lean-Fogg Lock Nut Co., Chicago, Ill., a corporation of Delaware
Filed Apr. 3, 1963, Ser. No. 270,467
7 Claims. (Cl. 151—21)

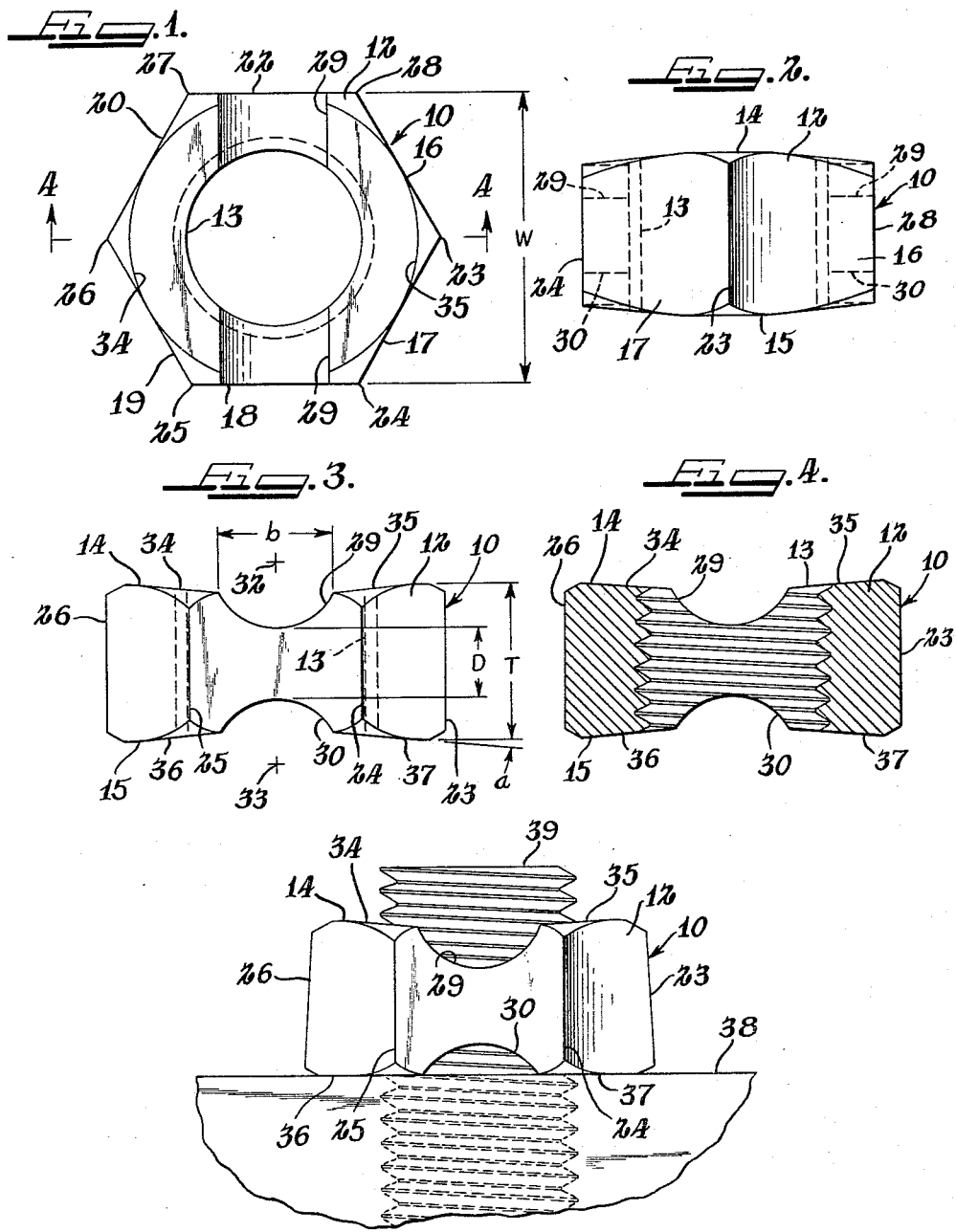

This invention relates to self-locking nuts, and more particularly to hexagonal self-locking nuts usable from either end and which are normally free-spinning on a coacting fastener element until the seating position is reached and then may be locked firmly without material weakening of the nut structure or the engaged threads.

One of the objects of this invention is to provide a normally free spinning nut structure which locks as a result of distortion when seated, and which has seating surfaces constructed and disposed to effect a definite limitation of nut distortion to that required for locking.

As another object, this invention comprehends the provision of a self-locking hexagonal nut wherein the end surfaces are grooved at positions aligned with the midregions of opposed flat side surfaces, thereby to provide localized regions for flexure to effect locking, while retaining full nut height at the corners between the side faces for wrench engagement.

Another object of the invention is to provide a self-locking hexagonal nut which, although having areas of reduced section for flexure to obtain locking action, has sufficient threads to afford strength.

This invention has within its purview the provision of a hexagonal self-locking nut wherein the structure, part relationships and proportions are correlated to establish in the nut such factors as ability to develop, in addition to a strong self-locking feature, the ability to accomplish full bolt tension, flexibility for locking action within the range of reasonable wrench torque, full length corners and limited external side distortion to provide good wrench holding characteristics.

Other objects and advantages of the invention will be apparent from the following description taken in conjunction with the accompanying drawings in which:

FIG. 1 is a top plan view of a self-locking nut embodying a preferred form of this invention;

FIGS. 2 and 3 are side elevational views of the self-locking nut shown in FIGURE 1, wherein the views are taken from positions 90° apart;

FIG. 4 is a side sectional view taken substantially on a line 4—4 and in the direction of the arrows, as indicated in FIG. 1; and FIG. 5 is a fragmentary side elevational view of a nut of the type shown in FIG. 1 shown in its tightened and locked position relative to a stud which projects from a part having a substantially flat seating surface.

In the exemplary embodiment of this invention which is depicted in the accompanying drawings for illustrative purposes, a hexagonal self-locking nut 10 has a body 12 with a central axial threaded opening 13 extending therethrough between opposed end surfaces 14 and 15. The nut body has side faces 16, 17, 18, 19, 20 and 22 which are disposed in opposed pairs and which intersect at corners 23, 24, 25, 26, 27 and 28.

At its opposite ends, and extending across the nut body 12 between the mid-regions of opposed side faces 18 and 22 are recesses 29 and 30, which recesses are concavely curved, and in the particular form disclosed, are arcuate with centers 32 and 33 located exterior to the opposite ends of the nut body. Opposite end surfaces of the nut are substantially alike, so that the nut is usable from either end. Also, considering a central axially disposed plane extending longitudinally of the recesses 29 and 30 and passing through the centers 32 and 33 of the recesses, as well as the center of the threaded opening 13 as a reference, the end surfaces 14 and 15 have portions on opposite sides of the plane which are substantially symmetrical with respect to one another. These end surfaces include substantially flat end surface portions 34, 35, 36 and 37. The end surface portions 34 and 35 extend outwardly from the opposite sides of the recess 29 and from the central threaded opening, while the end surface portions 36 and 37 extend outwardly from opposite sides of the recess 30 and the central threaded opening. In their extent outwardly from the opposite sides of the recesses 29 and 30 in directions lateral to the recesses, the end surface portions 34 and 35, and also the end surface portions 36 and 37 are angularly disposed with respect to one another in obtuse angular relationship, and so that they form an angle with respect to one another which is somewhat less than a straight angle. In FIG. 3, the deviation of the angularity of the end surface portion 37 from a straight angle is designated by the angle $a$. In the illustrated structure, the angle $a$, in various sizes of nuts, is between 4° and 6°, so that the angularity between the flat end surface portions at each end of the nut is between 168° and 172°.

The end surface portions 34, 35, 36 and 37 each being flat and being angularly disposed on opposite sides of each recess and end surface, it may be readily understood that opposite mid-regions of the flat end surface portions extend outwardly toward opposed corners 23 and 26 of the nut body, whereby those corner regions of the nut body are thicker than other portions thereof, so that initial contact between the nut body and an opposed flat surface, such as 38 in FIG. 5, when the nut is threaded onto a mating part, such as a stud 39, is at the opposed corner regions of the nut.

It is to be understood that nuts made in accordance with this invention shall be made of metal, such as steel of the type used in the usual standard nuts, sufficiently soft that when flexed by the action of the angularly disposed flat end surface portions when the nut is tightened, it takes a permanent set reaching its locked position and becomes a prevailing torque nut on release. It may also be observed that a limit of the locking distortion is reached when the flat end surface portions of one end surface of the nut bottom against an opposing flat surface, as shown in FIG. 5. In this respect, it is noteworthy that the opposed and aligned recesses 29 and 30 which limit the thickness of the nut body therebetween afford a flexure region for the nut body which is between the angularly disposed flat surface portions of the ends, and at which the nut body flexes when tightened against an opposing surface. Additionally, it is to be observed that the recesses 29 and 30 have a maximum width $b$ which is narrower than the diameter of the central threaded opening 13. Since the flat surface portions of the end surfaces of the nut body extend outwardly from the opposite sides of the recesses, and bottom against an opposing surface, there can be no further flexure of the nut body beyond the point at which the flat surface portions bottom, which further flexure would tend to lift the corners of the nut away from the flat surface, and further because there is a definite limit to the flexure of the nut body, greater bolt tension can be produced with nuts of this type than with others which have been known to exist.

It will be readily understood that nuts of the type herein disclosed spin freely and without any locking action until the nut makes its initial contact with an opposing surface. In flexing, as a result of the engagement of the angularly disposed flat end surface portions with an opposing surface, the locking action is produced by a tightening of the threads of the nut against those of the bolt or stud at the end of the nut remote from the opposed flat surface, as well as a distortion of the threads at the mid-region of the nut from their normal helical shape. This locking action should desirably be effected without the production of a sufficient distortional spread at the bottom surface of the nut to either weaken the nut body or materially weaken the threads or thread engagement between the nut and a bolt or stud at the bottom end region of the nut which would, in turn, limit the bolt tension which could be developed by tightening the nut.

In addition to the foregoing, there are certain additional structural and proportional characteristics of the disclosed nut which contribute to its effectiveness and efficiency as compared to those which have been known before. For example, by having the aligned and opposed recesses 29 and 30 extend between the mid-regions of opposed side faces, all corners of the nut body are left intact for their full lengths to provide improved wrench engagement, and to minimize the possibility of slippage of a wrench on the nut when it is tightened, and particularly when it becomes somewhat distorted as a result of its locking flexure. The angularity of the flat end surface portions of the nut is selected not only to produce effective locking action on bolts made within commercial limits, but also to obtain a full contact been each end surface portion and the opposing flat surface and also limit the produceable taper resulting from flexure which could limit engagement with a wrench.

In the disclosed nut structure, the width W of the nut body between flat side faces is approximately twice the maximum thickness T of the nut body. This relationship provides sufficient threads in the nut body to develop proper bolt and thread strength for commercial use, and also provides a nut having very effective locking action as a result of relatively small distortion. In order to provide a nut structure which is sufficiently strong and which is not either too easily flexed or too stiff to flex with reasonable applied force, the ratio of the maximum nut body thickness T to the minimum distance D between the recesses 29 and 30 is desirably kept between approximately 2¼ and 2¾ in different sizes of nuts.

From the foregoing description and reference to the accompanying drawings, it may be understood that this invention provides a double ended or two-way self-locking nut which spins freely until it makes contact with an opposing surface and wherein the structure, part relationships and proportions are correlated to establish in the nut such factors as ability to develop strong locking action, full commercial bolt tension, flexibility for locking action within the range of reasonable wrench torque, full length corners for wrench engagement and limited external side distortion to provide good wrench holding characteristics.

Having thus described our invention, what is claimed is:

1. A self-locking nut usable from either end of a coacting thread part and adapted to be tightened against an opposing flat surface, said nut comprising, in combination, a hexagonal nut body having substantially flat side faces intersecting at corners and like end surfaces in opposed relationship to one another, said nut body having a threaded central opening extending axially between the end surfaces and which is normally free running on the coacting threaded part, said end surfaces each being substantially symmetrical in contours and structure on opposite sides of a central plane passing through the centers of opposed side faces and axially of the nut body, said end surfaces having recesses of like size and concavely curved section and narrower than the diameter of said threaded central opening extending thereacross in opposed relationship to one another to provide a flexure region of reduced section across the mid-portion of the nut body in one direction, and said end surfaces having surface portions on opposite sides of said recesses which are each substantially flat and which normally extend away from one another laterally of each of the recesses in obtuse angular relationship to one another and have mid-regions extending practically to opposed corners of the nut body, the angle between said flat surface portions of each end surface being between 168° and 172°, so that initial contacts thereof against said flat opposing surface are only near said opposed corners of the nut body and the nut body is flexed sufficiently to take a permanent set at said flexure region when said flat surface portions bottom against the flat opposing surface when the nut is tightened and thereby limit the flexure of the nut body to a predetermined amount.

2. A self-locking nut as defined in claim 1, and wherein said threaded opening extends diametrically thereof into substantial portions of said substantially flat surface portions of the end surfaces of the nut body, whereby substantial portions of the flat surface portions are both inside and outside of opposed maximum diameter limits of the threaded central opening so that when bottomed against the opposing surface they cannot tilt beyond such bottomed position when tightening force is applied.

3. A self-locking nut as defined in claim 1, and wherein the ratio of the maximum thickness of the nut body and the minimum distance between said recesses in the flexure region is between 2¼ and 2¾.

4. A double ended self-locking nut adapted to have either end tightened against an opposing flat surface and comprising, in combination, a nut body having substantially flat side faces intersecting at corners and like end surfaces in opposed relationship to one another, said nut body having a threaded central opening extending axially between the end surfaces, said end surfaces having like recesses of concavely curved section and narrower than the diameter of said threaded opening extending thereacross in opposed and aligned relationship to one another at the mid-regions of opposed side faces to provide a flexure region of reduced section across the mid-portion of the nut body, and said end surfaces having portions extending outwardly from opposite sides of said recesses which are substantially flat and extend to the side surfaces of the nut body with the angle between said flat surface portions at each end of the nut body being less than a straight angle by approximately 8° to 12°, so that initial engagement of said end surface portions with the said opposing flat surface is only at opposite outer extremities of said flat surface portions and at positions spaced laterally of said recesses, and said nut body being flexed at said flexure region when tightened against said opposing flat surface until said flat surface only portions bottom against the opposing flat surface to limit flexure of the nut body to a predetermined amount and provide for the building up of holding pressure.

5. A double ended self-locking nut adapted to have either end tightened against an opposing flat surface and comprising, in combination, a nut body having substantially flat side faces intersecting at corners and like end surfaces in opposed relationship to one another, said nut body having a threaded central opening extending axially between the end surfaces, and end surfaces having like recesses of concavely curved section and narrower than the diameter of said threaded opening extending thereacross, in opposed and aligned relationship to one another at the mid-regions of opposed side faces to provide a flexure region of reduced section across the mid-portion of the nut body, and said end surfaces having portions extending outwardly from opposite sides of said recess which are substantially flat and extend to the side surface of the nut body with the angle between said flat surface portions at each end of the nut body being somewhat less than a straight angle, so that initial engagement of said end surface portions with the said opposing flat surface is only at opposite outer extremities of the flat surface portions and at positions spaced laterally of said recesses, said nut body being flexed at said flexure region when tightened against said opposing flat surface only until said flat surface portions bottom against the opposing flat surface to limit flexure of the nut body to a predetermined amount and provide for the building up of holding pressure, the overall thickness of the nut body being approximately half of the width between said faces, the minimum thickness between said recesses being between one-third and one-half of the overall thickness, and the normal angularity of each flat surface portion with respect to a straight angle being between approximately 4° and 6°.

6. A self-locking nut which is usable from either end, which turns freely on a co-acting threaded part until it engages an opposing flat surface and which is adapted to be tightened against the opposing flat surface, said nut comprising, in combination, a hexagonal nut body having substantially flat side faces intersecting at corners and end surfaces in opposed relationship to one another, said nut body having a threaded central opening therethrough which extends axially between the end surfaces, the opposite ends of said nut body having recesses of like size and contours therein which are symmetrical with respect to a central plane through the nut body and extend laterally of the nut body from the threaded opening substantially to two of said side faces which are opposed to one another, and said end surfaces having portions on opposite sides of said recesses which extend from said threaded central opening and said recesses practically to opposite corners of the nut body and to flat side faces of the nut body adjacent said opposite corners and are each substantially flat throughout their extent and which are angularly related to one another so that the angle between the said portions of each end surface is less than a straight angle by approximately 8° to 12°, each of said end surfaces being disposed to effect flexure of the nut body between said recesses while it is being tightened and to bottom against said opposing flat surfaces to limit the flexure of the nut body to a value affording good locking action and a permanent set of the nut body in the flexed position.

7. A self-locking nut as defined in claim 6, and wherein the positions of maximum thickness of the nut body are at the regions of opposed corners thereof, whereby only said regions seat first against the flat opposed surface.

References Cited by the Examiner
UNITED STATES PATENTS

| 1,111,382 | 9/14 | Hibbard | 151—21 |
| 1,204,491 | 11/16 | Roof | 151—21 |
| 1,420,725 | 6/22 | Mattson | 151—21 |
| 1,774,081 | 8/30 | Burns | 151—21 |
| 2,016,610 | 10/35 | Moeller | 85—32 |

FOREIGN PATENTS 30,796  3/85  Germany.

EDWARD C. ALLEN, *Primary Examiner.*